(12) United States Patent
Harrison et al.

(10) Patent No.: US 8,362,093 B2
(45) Date of Patent: Jan. 29, 2013

(54) ENHANCED SLURRIFICATION METHOD

(75) Inventors: John Harrison, Edinburgh (GB); Mark Zwinderman, Edinburgh (GB)

(73) Assignee: Surface Active Solutions (Holdings) Limited, Grangemouth (GB)

( * ) Notice: Subject to any disclaimer, the term of this patent is extended or adjusted under 35 U.S.C. 154(b) by 0 days.

(21) Appl. No.: 13/081,748

(22) Filed: Apr. 7, 2011

(65) Prior Publication Data
US 2011/0182135 A1   Jul. 28, 2011

Related U.S. Application Data

(63) Continuation of application No. 11/792,766, filed as application No. PCT/GB2005/004303 on Nov. 7, 2005, now abandoned.

(30) Foreign Application Priority Data

Dec. 9, 2004   (GB) .................................. 0426967.6

(51) Int. Cl.
- B01F 3/08 (2006.01)
- B01F 17/02 (2006.01)
- B01F 17/10 (2006.01)
- B01D 12/00 (2006.01)
- C02F 1/68 (2006.01)
- C02F 1/26 (2006.01)
- C11D 1/29 (2006.01)
- C11D 1/37 (2006.01)

(52) U.S. Cl. ............. 516/25; 516/20; 516/58; 516/63; 516/202; 516/900; 210/925; 510/365

(58) Field of Classification Search ............... 516/58, 516/63, 65, 20, 25, 202, 900; 210/749, 925; 510/365
See application file for complete search history.

(56) References Cited

U.S. PATENT DOCUMENTS

| | | | | |
|---|---|---|---|---|
| 2,356,205 | A | * | 8/1944 | Blair, Jr. et al. ............... 507/242 |
| 2,356,254 | A | * | 8/1944 | Blair, Jr. et al. ............... 507/242 |
| 4,136,217 | A | | 1/1979 | Henley |
| 5,008,026 | A | | 4/1991 | Gardner et al. |
| 5,034,140 | A | | 7/1991 | Gardner et al. |
| 5,415,777 | A | | 5/1995 | Krempen et al. |
| 5,656,585 | A | | 8/1997 | Grandmaire et al. |
| 5,741,769 | A | * | 4/1998 | Erilli ............................. 510/417 |
| 5,762,138 | A | | 6/1998 | Ford et al. |
| 5,833,756 | A | | 11/1998 | Haegel et al. |
| 5,846,913 | A | | 12/1998 | Sawdon |

(Continued)

FOREIGN PATENT DOCUMENTS

| WO | WO 99/05392 | 2/1999 |
|---|---|---|
| WO | WO 00/54868 | 9/2000 |

(Continued)

OTHER PUBLICATIONS

Comelles et al, "Butyl Lactate: a Useful Cosurfactant to Prepare O/W Microemulsions With SDS", Journal of Dispersion Science and Technology, 20 (7), 1777-1788 (1999—month unavailable).*

*Primary Examiner* — Daniel S Metzmaier
(74) *Attorney, Agent, or Firm* — Drinker Biddle & Reath LLP

(57) ABSTRACT

A method of slurrifying oil contaminated materials by introducing a microemulsion or microemulsion-forming surfactant(s) to the material and subjecting the mixture to suitable shear or mixing forces to suitably blend such mixtures. The method may be applied directly to wastes such as waste drill mud cuttings and muds, emulsions, sludges, or soil substrates contaminated with water and/or oil drilling fluids in order to both reduce the viscosity and improve the lubricity, wetting, and flow properties of the substrate.

14 Claims, 4 Drawing Sheets

U.S. PATENT DOCUMENTS

| | | |
|---|---|---|
| 6,190,646 B1 | 2/2001 | Tellier et al. |
| 6,268,330 B1 | 7/2001 | Leonard et al. ............... 510/417 |
| 6,797,684 B2 * | 9/2004 | Henneberry et al. ......... 510/365 |
| 7,902,123 B2 * | 3/2011 | Harrison et al. .............. 516/902 |
| 8,183,182 B2 * | 5/2012 | Oliveira et al. ................ 516/25 |
| 2002/0010104 A1 | 1/2002 | Ewbank et al. |
| 2003/0166472 A1 | 9/2003 | Pursley et al. |
| 2004/0127749 A1 | 7/2004 | Harrison et al. |
| 2007/0295368 A1 * | 12/2007 | Harrison et al. ................ 134/42 |
| 2009/0221456 A1 * | 9/2009 | Harrison et al. ............... 507/266 |

FOREIGN PATENT DOCUMENTS

| | | |
|---|---|---|
| WO | WO 2005/023430 | 3/2005 |
| WO | WO 2006/051255 A1 * | 5/2006 |

* cited by examiner

ENHANCED SLURRIFICATION METHOD

CROSS-REFERENCE TO RELATED APPLICATION

This is a continuation of application Ser. No. 11/792,766, filed Jul. 9, 2007, abandoned, which is the US national stage of PCT/GB2005/004303, filed Nov. 7, 2005. The entire disclosures of the aforesaid applications are incorporated herein by reference.

FIELD OF THE INVENTION

This invention relates to a method for the enhanced slurrification of oily materials. More particularly, the invention relates to the enhanced slurrification of oily materials to allow facilitated transport and/or treatment or subterranean re-injection of e.g. oil contaminated drilling and production wastes produced from oil and gas industry operations or other oil contaminated soil, sludges or emulsion wastes generated by other industrial sectors.

BACKGROUND OF THE INVENTION

Within many industries and the oil industry in particular, oily soils, sludges and emulsions may be produced at various times throughout the regular operations or processes employed within the sector. Increasing environmental awareness and more stringent environmental regulation has necessitated the more frequent movement, handling, and treatment of such wastes and more sophisticated and environmentally benign methods of disposal.

Historically, many such wastes were either disposed of directly into the receiving environment in either a controlled or an uncontrolled manner or stored in pits, lagoons or ponds where natural seepage and evaporation reduced the level of liquids leaving viscous solids and sludge residues. Alternatively such wastes may have been incorporated in landfills, pumped into disused mine shafts and salt mines, or injected into old oil wells as a solution to finally dispose of the materials from the generation site location.

Oily wastes from within the oil industry occur at numerous stages from the drilling phase through to the delivery of consumer products. At the well drilling phase the use of "oils" in drilling fluids is often encountered, particularly when the drilling of water sensitive formations or directional drilling is required. The "oil" may be used either as an additive to the aqueous based drilling fluid (generally termed as muds) or as the base of the drilling fluid such as in oil-based mud (OBM) or invert oil emulsion mud (IDEM). The "oil" used within mud encompasses a range of materials as the hydrophobic fraction. Crude oils, fuel fractions (such as diesel or kerosene), white oils, esters, selected olefins, acetals and many other materials have all been used within muds either as the liquid base of the mud or as an additive to the mud. The use of such muds can result in the generation of considerable quantities of oil contaminated drilled material removed from the well (referred to within the industry as waste drill mud cuttings or cuttings). These contaminated cuttings materials were frequently disposed of off site spreading in both land and marine environments or transported to landfill sites, possibly with some intermediate oil reduction or stabilisation phase. Within the industry literature, there are numerous references to cuttings cleaning equipment and several devices for oil reduction of cuttings have been patented. In the late 1980's, the use of subterranean injection into well annuli became popular with the first process being patented by the ARCO oil company (now incorporated within BP). Several other patents exist for such equipment based on different comination technologies (such as wet autogenous grinding and ultrasonics).

One major current method of transportation is known as "skip and ship" whereby the wastes are loaded into containers or skips. These are then lifted by crane to waiting vessels, and the containers are transported back to shore for offloading at the dockside. However, there are problems associated with this method especially concerning the significant logistics involved. Suitable deck space is required both on the operating platform and on the transport vessel to accommodate the skips. The required lifting apparatus must be present along with the personnel to operate such equipment. In addition, there are considerable health and safety risks involved when moving large quantities of this kind of equipment under sea faring conditions in relatively short time periods. The same disadvantages are also encountered at the dockyard for the tasks of unloading to treatment and disposal sites. Also when at sea such operations are limited by the weather conditions and these operations must be put on hold when weather conditions become more severe. This may result in significant downtime and lost revenues.

Alternatives to this method of transportation have been designed to eradicate the use of skips and the movement thereof. Many of these alternative transport methods require and rely on the homogenization and slurrification of these essentially solid oil contaminated wastes in order to enable and facilitate pumping methods and techniques. The processed wastes are then pumped direct through piping mechanisms to containers or holds on waiting shipping vessels. Similar operations then take place at the quayside for unloading. This allows the ability to process and transport the cuttings as they are produced in drilling operations whilst using minimal deck space and whilst avoiding the use of lifting engineering equipment and personnel therefore operations are less hampered by prevailing weather conditions.

Cuttings are also often moved between sites for disposal by either vacuum truck or in tanks and containers. The irregular nature of the drilled rock particles and the in-built viscosity of the drilling fluids poses significant handling problems for all of the above processes and it is common for other fluids such as muds, water and oil to be added to increase the ease of handling. This can considerably increase the amount of materials that need to be treated or disposed of, increases the volumes that may be required to be transported, and can incur additional costs for the dilution fluid, especially if they are oils or muds.

In the production of oil and gas solids may be produced with the hydrocarbons which can settle in vessels and tanks. Removal of such materials may be by manual application, vacuum suction or sludge pumps. Dilution, usually in the form of water is common to mobilise the settled materials whilst oils may often be used to facilitate the dissolution of the heavier ends of the oil to aid in mobilisation of the material so that pumps may be used. The addition of other extraneous liquid again increases the volumes of wastes to be handled and treated/disposed of. In addition, the use of hydrocarbon oils complicates the operations in terms of fire/explosion protection and the protection of operators from exposure to vapours that may be carcinogenic or otherwise hazardous to health.

Emulsions may also be formed within tanks vessels or collection ponds or lagoons that require removal, treatment and/or disposal. These may be of considerable viscosity and contain low to moderate levels or particulate or waxy material precipitated from the oil. Similar materials may also occur after oil spills at sea. These materials may be oil continuous, but contain up to 80% water. Moreover, in general water added to reduce viscosity can exhibit a hydrating effect in the presence of oil-contaminated shales and the like resulting in an extremely high viscosity or indeed a congealed material. The viscosity of both the oil spill and production emulsions can be several hundreds of thousands of centipoises, making them virtually impossible to pump other than by very specialist equipment. Consequently, dilution may be used to facilitate pumping by a wider range of units.

SUMMARY OF THE INVENTION

According to the invention there is provided a method of slurrifying oil contaminated materials by introducing a microemulsion or microemulsion-forming surfactant(s) to the material and subjecting the mixture to suitable shear or mixing forces to suitably blend such mixtures.

Preferably, the chemical formulation comprises a surfactant or a mixture of surfactants which is an oil-in-water (O/W) or a water-in-oil (W/O) microemulsion-forming surfactant (s).

More preferably the chemical formulation comprises an oil-in-water (O/W) or a water-in-oil (W/O) microemulsion.

Suitably the chemical formulation further comprises a diluent.

Advantageously the microemulsion (forming) surfactant (s) comprises a biosurfactant.

Preferably the chemical formulation comprises a salt or a mixture of salts.

More preferably the chemical formulation comprises a co-surfactant or mixture of co-surfactants.

In one embodiment, the microemulsion (forming) formulation comprises a co-solvent.

Preferably, the co-solvent comprises a light oil hydrocarbon or an oxygenated solvent to stabilise the O/W or W/O microemulsions In one embodiment, the surfactant further comprises an enzyme or combination of enzymes Advantageously, the enzyme is of either natural or synthetic production.

In a further embodiment of the invention the slurrified oil contaminated material is further treated or processed to clean, remediate or phase separate the slurrified oil contaminated material into its separate clean solid, water/brine and organic fractions.

This invention therefore relates to the design and method for using surfactants and surfactant formulations which have either oil-in-water (O/W) or water in oil (W/O) microemulsion forming properties or which are microemulsions in their own right for use in enhancing the slurrification and pumpability of oily (waste) materials.

DETAILED DESCRIPTION OF THE INVENTION

The term microemulsion was first referred to in the 1950's to describe specific surfactant stabilised immiscible fluid systems that exhibited extremely low interfacial surface tensions. At the time, it was thought that these mixtures were like conventional emulsion systems (macroemulsions), but with much smaller droplet (micelle) sizes, hence the use of the term. The terminology is still in use today but the modern understanding of these systems originally described show that microemulsions are fundamentally different from small droplet conventional emulsion type systems. Microemulsions are dynamic systems with structures, which may or may not be droplets that form, disintegrate, and reform in milliseconds. Several structures or domains are known to exist—the simplest being that of the micelle, with lamellae, spherulite and bi-continuous (sometimes referred to as a sponge phase) structures or domains being present, or existing as transitional stages between other structures. Other structures such as interconnected rod micelles and vesicles have been proposed from theoretical studies. Microemulsions are optically transparent as the phase domains are much smaller; the size of the structures or domains being in the range from less than a hundred nanometers to several hundred nanometers and thus light passes through the system without scattering.

Microemulsions are thermodynamically stable which means that they form spontaneously when the components are brought together and are stable as long as the ingredients and formation conditions remain stable.

An oil-in-water (O/W) microemulsion is defined as a thermodynamically stable, mixture of oil, water and surfactant, such that the continuous phase is water (which may contain dissolved salts) and the dispersed phase consists of a mono-dispersion of oil structures or domains, each coated with a close-packed monolayer of surfactant molecules. The inherent thermodynamic stability arises from the fact that, due to the presence of the close packed surfactant monolayer, there is no direct oil-water contact at the oil-water interface.

Microemulsions are very different from conventional emulsion structures that are not thermodynamically stable, but are formed by the application of energy and surfactants even though nanometer-sized droplets can be formed using high-pressure homogenisers (nanoemulsions).

Conventional emulsion forming surfactant systems have relatively high interfacial surface tension properties. As such, they are less efficient than microemulsion-forming surfactant-based systems of the invention for the mobilisation of oily materials.

The extremely low interfacial tensions make microemulsions extremely good at oil removal and slurrification. The surface tension at plain oil-water interfaces is typically of the order of 50 mNm$^{-1}$. Emulsions formed by mixing oil water and an "ordinary" (i.e. non-microemulsion forming) surfactant are typically characterised by surface tensions of the order of 0.1-30 mNm$^{-1}$, whereas in the systems of the invention microemulsions can be characterised by far lower surface tensions—of the order of $10^{-3}$-$10^{-6}$ MN m$^1$. These latter values reflect the absence of direct oil-water contact.

This invention relates to the application of microemulsion technology and more precisely to the use of chemical microemulsion forming surfactant formulations and the design of specialist microemulsion forming surfactants for use in said formulations to be used in all aspects of enhanced slurrification and transport of oil emulsions, sludges, slops contaminated soils and drill cuttings. The formulation of the microemulsion forming surfactant(s) can be designed specifically to address the contaminant oil and any solid material with the choice of an oil-in-water (O/W) or water-in-oil (W/O) microemulsion being based on the relative amounts of oil or water found within the original waste. The system may also be tailored for any naturally occurring surfactants occurring within the waste or those that are inherent to the waste by design of the contaminant.

For example, in the case of invert oil emulsion mud contaminated drill cuttings the mud itself contains a range of surfactants as emulsifiers and oil wetting agents used to ensure that the invert emulsion is stable over the expected range of pressures and temperatures that are to be encountered in the well to be drilled, and that the mud solids in the system, and the additional surfaces generated form the drilled rock, are maintained in an oil wet condition. Drilling fluids are thixotropic fluids having a gel structure to suspend the mud solids and facilitate easy and efficient transport of cuttings within the wellbore. By converting the oil phase adhering to the waste rock from an invert oil emulsion to a microemulsion the viscous forces and gel structures are significantly reduced and the materials become fluid and more mobile without any requirement for dilution materials, though they could also be used if desired. This allows conventional pumps and vacuum suction devices to transport the materials more easily, without significantly increasing the volume of the waste stream. In such a case, it is therefore important that the oil fraction remains present within the waste stream itself.

For subterranean injection where conventional grinding systems are used, the greatly increased surface area can lead to the material being converted to a stiff paste resulting in system failure without the addition of additional oil or water and the wettablity state of the subsequent mix is variable. The result of the additions of other liquids may also give rise to settlement of the solids or swelling of water sensitive materials. Both these conditions have been attributed as causes of the loss of the injection well or well annulus with consequent cessation of operations and significant financial loss.

This invention recognises and accounts for the importance of the solids type, oil content existing surfactants, surface area and inter-particle reactions that can occur. Surprisingly, it has been found that where additions of small quantities of microemulsion forming surfactants and microemulsion surfactant formulations are made to a paste of the type described above, a fine particle size high solids concentration slurry that is stable and of low viscosity is achieved. Where, it is desirable to maintain the rock surfaces as oil wet or non swellable by generating, a water-in-oil (W/O) microemulsion is employed. Alternatively or where the contaminating mud is a water-based mud (WBM), an oil-in-water (O/W) microemulsion can be utilised. Where an oil reduction system has been used with invert oil emulsion mud contaminated cuttings the choice of forming an oil-in-water (O/W) or water-in-oil (W/O) microemulsion system may apply.

The selection of which microemulsion system to utilise is based on the oil content, rock type desired, slurry properties and cost. The invention does not allow barite sag to take place and even if this does occur it does not result in the formation of a highly viscous mud cake at the bottom of storage tanks as with the methods of the prior art. Instead, in the present invention, the solid fraction remains highly mobile such that simple pumping or agitation will suffice to mobilise the stream.

The microemulsion forming surfactants of the invention are functional with most current forms of grinding equipment without the requirement for additional dilution liquids. However, if necessary additional amounts of sea water and/or oil can be added if desired without undesirable hydration of the oil contaminated drilling or production wastes.

The present invention has a number of key advantages over techniques of the prior art in addition to the capability of simply reducing viscosity and aiding flow rates and ease of transport of such materials as described above. Traditional methods in the oil and gas industry for example use large volumes of added oil which increases the volume of waste typically by circa 30%. Alternatively water is often added which can increase the volume of waste to be transported and/or re-injected into the formation by up to an order of magnitude. As previously described, this is particularly the case when clay (shale) based materials are to be slurrified. These materials swell in the presence of water and can become quite sticky in nature potentially hampering the reinjection process.

The present invention not only reduces the viscosity of oil contaminated drilling and production wastes but does so without any significant increase in waste stream volume and, despite the fact that water is often added, does not result in swelling and hydration of the clay components. As a result the volumes of waste are kept to an absolute minimum which has additional significant time, cost and transportation logistical advantages commercially.

Furthermore, the use of microemulsions in the method of the invention results in the formation of lubricant within the waste system increasing lubricity of the materials to be transported improving flow rates and preventing blockages which in turn reduces the risks of the operations concerned.

The invention finds application with sludges, tank bottoms, contaminated soils and emulsions in the same way as with drilled cuttings, though the microemulsion situation is simpler due to the lack of a variety of solids associated with such materials.

The invention is adapted to form temperature stable microemulsion systems. This is important as downhole conditions for the cuttings re-injection application can raise the temperature significantly but this in turn will not effect the phase behaviour and physico-chemical properties of the waste stream and the microemulsion surfactant products used.

Importantly as an option the microemulsion systems of the invention have the capability to exhibit a transition form W/O to O/W microemulsion systems without encountering unstable multi phase or gel/liquid crystalline transitional phases. When these types of microemulsion system are utilized the oily material can be slurrified at the point of production with small amounts of surfactant providing an oil continuous slurry. When at a suitable site water or brine can be added to the stream causing the microemulsion phase to undergo the transition from a W/O to an O/W state and the solid materials in the stream may be cleaned accordingly. Such waste may therefore be treated away from the site of production following the transport process without the need for any additional chemical, thermal or alternative treatment to yield separate phases of clean solids, clean water/brine and oil for recovery and recycling/disposal.

Anionic surfactants suitable for use in forming the microemulsions and microemulsion forming systems in accordance with the present invention include fatty acid soaps, alpha olefin sulphonates, sulphonates, amine ethoxylates, amine salts of linear alkyl benzene sulphonic acid, aromatic sulphonates comprising alkyl cumene, xylene, benzene and toluene sulphates or sulphonates, earth metal salts of olefin sulphonate and alcohol and alcohol ethoxylate sulphates and sulphonates, sulphosuccinates and sulphosuccimates and blends of such anionic surfactants. However, as will be appreciated by those skilled in the art, the use of anionic surfactants is not limited to these.

Nonionic surfactants suitable for use in forming the microemulsions and microemulsion forming systems in accordance with the present invention include ethoxylated and propoxylated surfactants consisting of condensation products of ethylene oxide with aliphatic alcohols and of alkyl amines in either straight or branched chain configuration, sugar based surfactants, alkyl polyglucosides, alkyl glucosides, and blends of such nonionic surfactants. As will be appreciated by those skilled in the art the use of non-ionic surfactants is not limited to these.

Cationic surfactants suitable for use in forming the microemulsions and microemulsion forming systems in accordance with the present invention include quaternaries, halogenated amines, complex amides, amido amines and blends of such cationic surfactants. Again, as will be appreciated by those skilled in the art, the use of cationic surfactants is not restricted to these.

Zwitterionic surfactants suitable for use in forming the microemulsions and microemulsion forming systems in accordance with the present invention include betaine surfactants e.g. alkyl dimethyl betaines or cocoamidopropyl betaines and blends of such zwitterionic surfactants. Again, as will be appreciated by those skilled in the art, the use of zwitterionic surfactants is not restricted to these.

Optionally organic solvents can be used in such formulations and those suitable for use in forming the microemulsions and microemulsion forming systems in accordance with the present invention may include diesel but preferable are synthetic (low toxicity) base oils, aromatic hydrocarbons, limonene, d-limonene, citrus terpenes, terpenes, terpinol, pinenes, pentanes, paracymene, n-alkyl pyrrolidones, dimethyl piperidone, propylene carbonate, ethers, di-butyl ether, butyl butyrate, amyl acetate, acetates, oleates, stearates, heptanoate, laurates, caprylates, adipates, butyrates, iso-butyrates, esters, di-basic esters, di-ethers, olefins, alpha olefins, xylene, toluene, benzene, alkyl benzenes, isoparrafins, ketones, acyclic amides, cyclic amides, lactones, ketones, sulphoxides, cyclic carbonates, oxygenated solvents, Arivasol and mixtures thereof. As will be appreciated by those skilled in the art, the use of organic solvents is not restricted to these.

Various embodiments of the invention will now be described, by way of example only, having regard to the accompanying drawings as examples in which:

Figure 1:
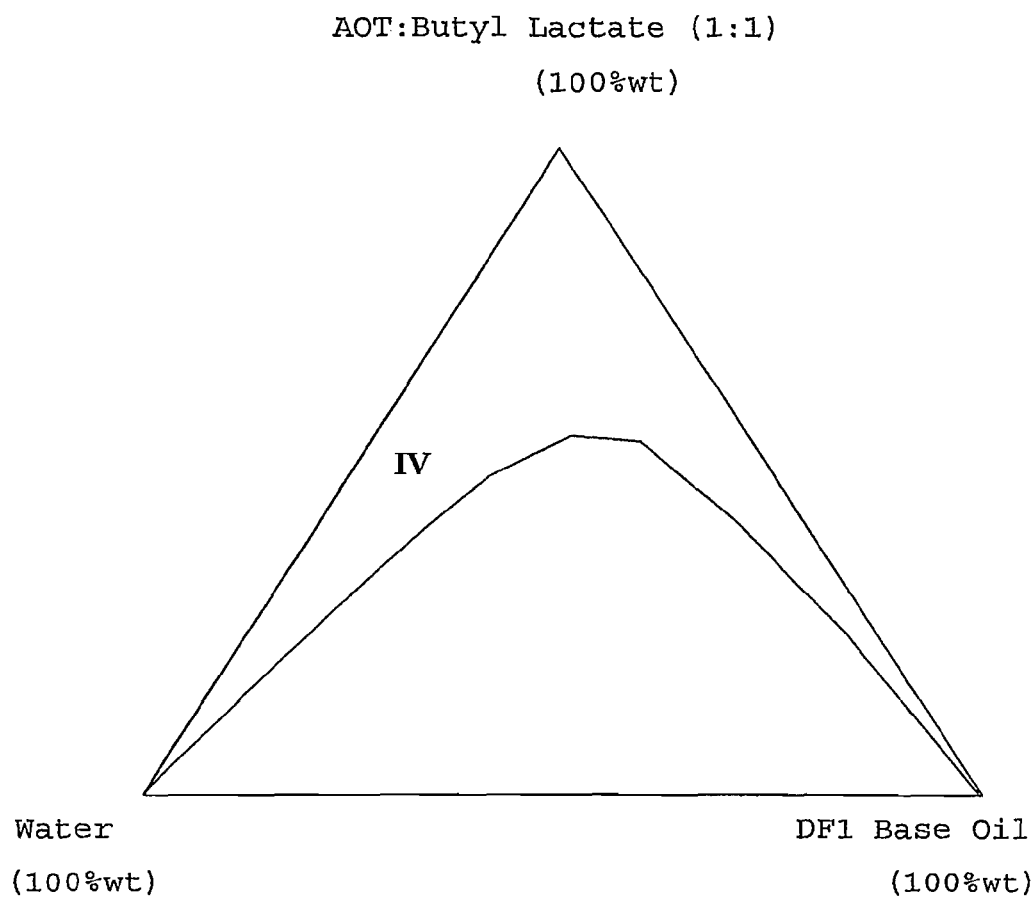
FIG. 1 is a pseudotemary phase diagram (AOT:Butyl Lactate at 1:1 ratio water and DF1 Base Oil at 25° C.

As shown in the drawings, surfactant behaviour can be quantified in terms of triangular phase diagrams. For example the phase diagram for the system water/sodium sulphosuccinate+butyl lactate/DF1 base oil is shown in FIG. 1. Here, sodium sulphosuccinate and butyl lactate is a mixture of the anionic surfactant sodium dioctyl sulphosuccinate (AOT) and butyl lactate (BL). BL acts as a co-surfactant, enhancing the O/W microemulsion-forming properties of AOT. As long as the AOT and BL are held at constant ratio, they can be treated as a single component for the purpose of constructing the phase diagram. The oil used was DF1 Base Fluid, a typical synthetic base fluid used in the preparation of oil based drilling muds in the North Sea.

The apexes of the phase diagram each correspond to one of the components in pure form—oil, water, or surfactant at the stated ratio. Any point on one of the axes corresponds to a mixture of two of those components in a defined ratio (given in percent weight; % wt). Any point within the phase diagram corresponds to a mixture of the three components in a defined ratio.

Figure 2:
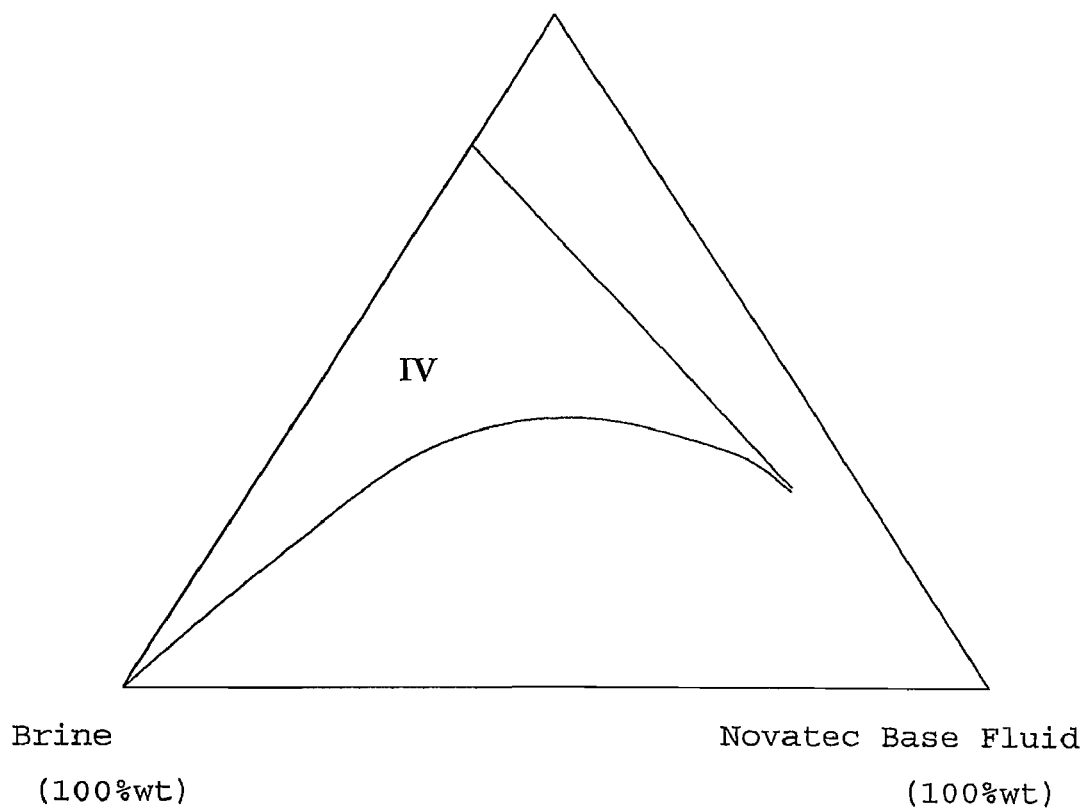
FIG. 2 is a pseudotemary phase diagram (SDS+B ratio, 1:1 or 1:2 by weight) 0.5M NaCl and Novatec Base Fluid at 25° C.
Figure 3:
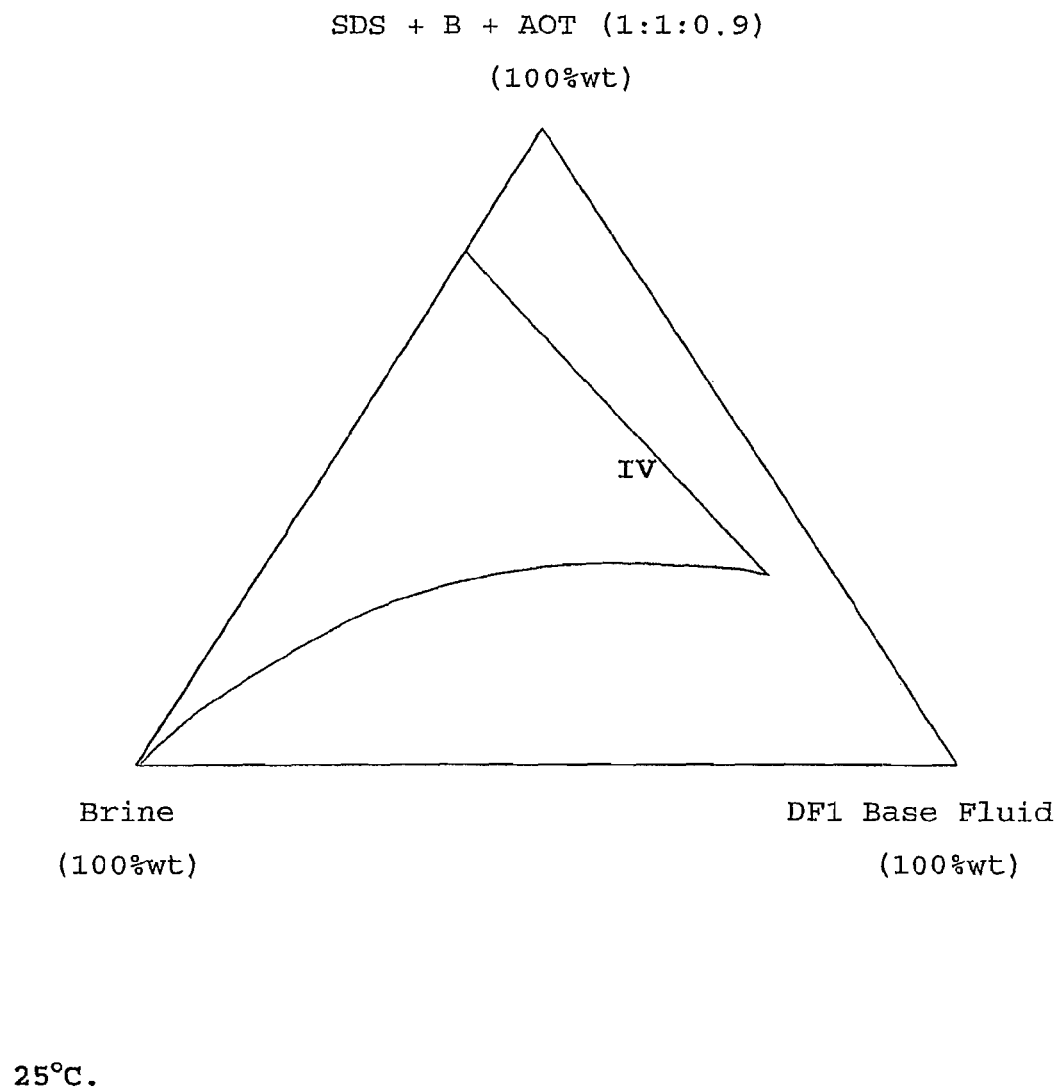
FIG. 3 is a pseudoternary phase diagram (SDS+B+AOT ratio, 1:1:0.9 by weight) 0.5M NaCl and DF1 Base Fluid at 25° C.
Figure 4:
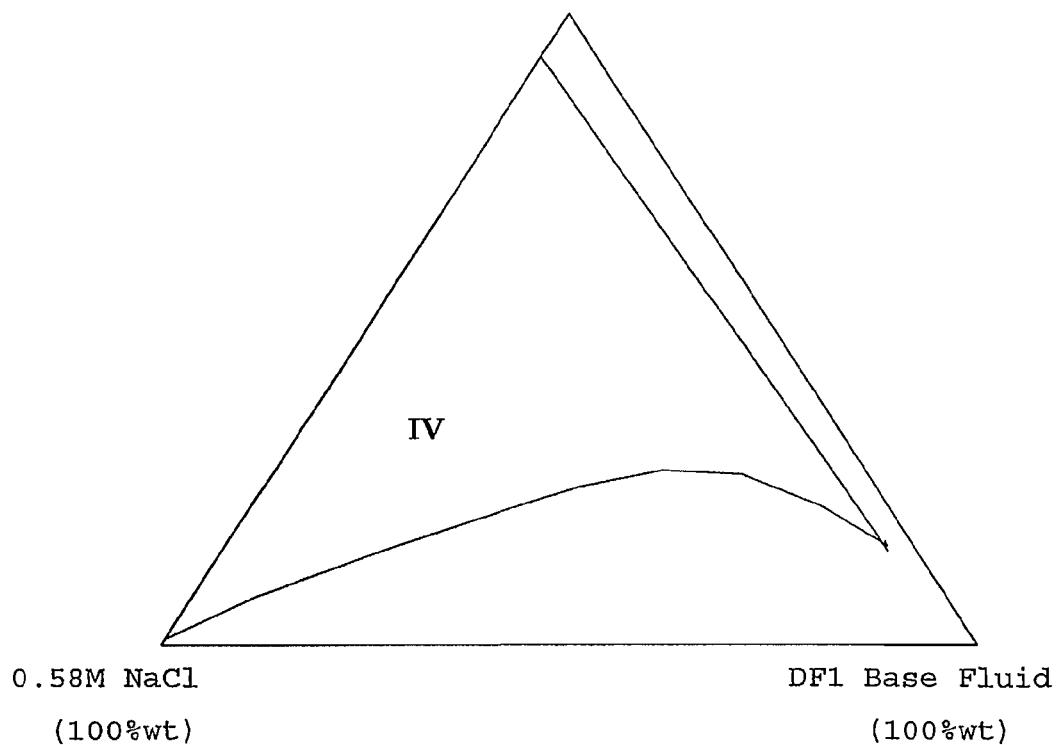
FIG. 4 is a pseudoternary phase diagram (Sodium Alkyl Ether Sulphate:Butyl Lactate:AOT at 1:1:0.6 ratio, 0.58M NaCl and DF1 Base Oil at 25° C.).

The physical state of the mixture at equilibrium can be mapped on to the phase diagram. The phase diagrams in FIGS. 2, 3 and 4 for example are characterized by a prominent single phase O/W microemulsion region, known as a Winsor IV system, which extends from the surfactant/water axis towards the surfactant/oil axis. Outside of the Winsor IV region is an area that corresponds to a number of equilibrium multi-phase regions commonly known as Winsor I, II, or III regions. Alternatively the region is typically a gel, liquid crystal or a multi-phase system.

Many previously known types of microemulsion could be described as being "static" oil holding microemulsions. This is to say that, through blending the components of the system with the correct combination of chemical constituents in the right order, a stable single phase O/W microemulsion system may be formed. However, these static types of microemulsions using such combinations of ingredients will not form a single phase microemulsion if they are combined in slightly different proportions or in a different order. Once a single phase microemulsion has been formed in these static systems any significant change in environmental variable or any variation in the amounts of any one of the chemical components to the system will result in phase separation and multi phase systems. As a result static microemulsion systems are extremely susceptible to slight environmental and chemical changes and they therefore may have very limited use in industrial applications such as those described here. Such systems may also only take up a very specific amount of oil into the microemulsion.

The majority of the microemulsion (forming) systems described herein are very different in their capabilities. These microemulsion systems are "dynamic" in nature. The result is extremely large Winsor IV regions or ~windows" especially at low AI concentrations (see FIGS. 2, 3, and 4). This characteristic facilitates the practical, robust and cost efficient application of these systems in the field which, in the past, has been a hindrance to their commercialization.

In dynamic microemulsion systems these can be formed by mixing the constituents together in any order and in any number of different proportions within this window of opportunity in the phase diagram providing a virtually endless number of formulation options and active ingredient concentrations within given environmental parameters. Once again this has significant practical benefits in the field with regards to ease and time of product manufacture. As a result dynamic systems can be applied as an aqueous surfactant system which is then capable of solubilising various amounts of oil into the system by microemulsification forming an O/W microemulsion during the cleaning process. Alternatively the products may be applied as an O/W microemulsion cleaning formulation with organic solvent already present therein.

The following examples are presented to demonstrate both the optimisation of microemulsion (forming) surfactant formulations for use in the field, the increase in operational efficiency demonstrated by each step in advance over the prior art, and to demonstrate the technology in operation. In the following examples, waste drill mud cuttings were treated using an example North Sea drill cuttings waste stream. 2 Kg waste samples were dosed with sea water for a control and mixtures of sea water with product for treatments. Each sample was then mixed and homogenized with a small paddle mixer rotating at 2000 rpm for 3 minutes. The samples were then subject to a standard international mud rheology laboratory viscosity test—a slump test based on a modified version of ASTM C143-90 method that was conducted to determine the effect of additives on the viscosity of cuttings.

Experimental Technique:—

A container with a volume of 225 cm3 (with dimensions of height=92 mm, width (top)=68 mm and width (base)=45 mm) was filled with cuttings which had been treated with chemical. A metal tray was placed over the container and the container was inverted (care being taken to avoid spillage). The container was removed releasing the cuttings into the tray. When the cuttings had ceased flowing the height of the slump was determined and recorded. Knowing the density of the fluid and the height we can estimate the force was measured in gm/cm3 and then converted to a yield point measured in pascals.

The results are presented in Table 1 below. As can be seen the products when used at 2.5-5% wt with similar quantities of sea water provide a surprisingly significant reduction in viscosity and mobility of the waste stream. The most efficient of these systems was capable of reducing the viscosity of the waste stream by circa 90% using less than 3% wt chemical compared to the control using only sea water. It is likely that these products, when used in the field, produce even better reductions in viscosity indicative of the better engineering and higher shear rates generated during mixing under field conditions. Typical dose rates of 0.1-3% are likely to suffice for successful operational parameters to be'met providing for very advantageous economics.

TABLE 1

Results to show the effect of chemical additives disclosed on the reduction in viscosity of waste oil contaminated solids.

| Results | Height (mm) | Force (g/cm3) | Yield Point (pa) | % Reduction |
|---|---|---|---|---|
| Seawater Control | 25 | 4.0 | 392 | 0 |
| 5% wt SDS/B/AOT (1:1:0.9) and 5% wt seawater | 15 | 2.4 | 235 | 40 |
| 5% wt Alkyl ether sulphate/BL/AOT (1:1;0.6) and 5% wt seawater | 10 | 1.6 | 156 | 60 |
| 2.5% wt Alkyl ether sulphate/BL/AOT (1:1:0.6) and 2.5% wt seawater | 3 | 0.48 | 47 | 88 |

The invention is not limited to the embodiments herein described which may be varied in construction and detail.

The invention claimed is:

1. A composition comprising alkyl ether sulphate, butyl lactate and sodium dioctyl sulphosuccinate in a respective ratio of 1:1:0.6 by weight.

2. The composition of claim 1, further comprising a diluent.

3. The composition of claim 2, wherein said diluent is water, sea water or brine.

4. The composition of claim 3, comprising sea water, which sea water is present in a proportion by weight equivalent to the combined weight of said ether sulphate, butyl lactate and sodium dioctyl sulphosuccinate.

5. The composition of claim 1 which is an oil-in-water (O/W) or a water-in-oil (W/O) microemulsion-forming surfactant.

6. The composition of claim 1, further comprising an enzyme or combination of enzymes.

7. The composition of claim 6, wherein the enzyme or combination of enzymes is naturally produced.

8. The composition of claim 6, wherein the enzyme or combination of enzymes is synthetically produced.

9. A method of slurrifying oil-contaminated material by introducing into said material a composition comprising alkyl ether sulphate, butyl lactate and sodium dioctyl sulphosuccinate, wherein said alkyl ether sulphate, butyl lactate and sodium dioctyl sulphosuccinate are present in a respective ratio of 1:1:0.6 by weight, and subjecting the mixture to shear or mixing forces to blend the mixture.

10. The method of claim 9 wherein the mixture comprises 0.1 to 5% wt. of the combination of said alkyl ether sulphate, butyl lactate and sodium dioctyl sulphosuccinate.

11. The method of claim 10 wherein the mixture comprises 2.5 to 5% wt. of the combination of said alkyl ether sulphate, butyl lactate and sodium dioctyl sulphosuccinate.

12. The method of claim 11 wherein the mixture comprises 2.5% wt. of the combination of said alkyl ether sulphate, butyl lactate and sodium dioctyl sulphosuccinate.

13. The method of claim 9, wherein the mixture is further treated to phase-separate the slurrified oil-contaminated material into separate clean solid, water/brine and organic fractions.

14. The method, as claimed in claim 9, wherein said mixture is transported away from the site of shear or mixing for additional treatment.

* * * * *